United States Patent
Kim et al.

(10) Patent No.: US 9,481,266 B2
(45) Date of Patent: Nov. 1, 2016

(54) VEHICLE SEAT RAIL LOCKING DEVICE

(71) Applicant: HYUNDAI DYMOS INCORPORATED, Seosan-si, Chungcheongnam-do (KR)

(72) Inventors: Hyun Soo Kim, Seoul (KR); Sang Nam Park, Asan-si (KR); Sung Kon Moon, Hwaseong-si (KR)

(73) Assignee: HYUNDAI DYMOS INCORPORATED (KR)

( * ) Notice: Subject to any disclaimer, the term of this patent is extended or adjusted under 35 U.S.C. 154(b) by 0 days.

(21) Appl. No.: 14/724,294

(22) Filed: May 28, 2015

(65) Prior Publication Data
US 2015/0258915 A1 Sep. 17, 2015

Related U.S. Application Data

(63) Continuation of application No. PCT/KR2013/010853, filed on Nov. 27, 2013.

(30) Foreign Application Priority Data

Nov. 28, 2012 (KR) .................. 10-2012-0136454

(51) Int. Cl.
*F16M 13/00* (2006.01)
*B60N 2/08* (2006.01)
*B60N 2/07* (2006.01)

(52) U.S. Cl.
CPC ........... *B60N 2/0806* (2013.01); *B60N 2/0705* (2013.01); *B60N 2/0715* (2013.01); *B60N 2/0818* (2013.01); *B60N 2/0843* (2013.01); *B60N 2/0875* (2013.01)

(58) Field of Classification Search
CPC .... B60N 2/08; B60N 2/0705; B60N 2/0843; B60N 2/0875
See application file for complete search history.

(56) References Cited

U.S. PATENT DOCUMENTS

| 7,722,006 B2* | 5/2010 | Beneker | B60N 2/0806 248/424 |
| 7,980,525 B2* | 7/2011 | Kostin | B60N 2/0806 248/429 |
| 9,050,908 B2* | 6/2015 | Speck | B60N 2/0705 |
| 2008/0308704 A1 | 12/2008 | Kostin | |
| 2008/0315662 A1* | 12/2008 | Suck | B60N 2/0806 297/463.1 |

FOREIGN PATENT DOCUMENTS

| JP | 2004-513821 A | 5/2004 |
| KR | 10-2006-0029520 A | 4/2006 |
| KR | 10-2007-0044905 A | 5/2007 |
| KR | 10-0723991 B1 | 6/2007 |
| WO | 2011/120920 A2 | 10/2011 |

OTHER PUBLICATIONS

International Search Report issued Dec. 30, 2013 in International Application No. PCT/KR2013/010853.

* cited by examiner

*Primary Examiner* — Amy Sterling
(74) *Attorney, Agent, or Firm* — Brinks Gilson & Lione

(57) ABSTRACT

The present disclosure provides a locking device which includes a fixed rail, a moving rail sliding relative to the fixed rail, locking pins arranged along the moving rail, locking springs disposed around the locking pins, and an unlocking lever rotating around a shaft fixed to the moving rail so as to relieve the locking pins from a locked state where the locking pins are inserted into the holes. The present disclosure thereby provides the locking device for a seat rail having a compact configuration.

6 Claims, 8 Drawing Sheets

VEHICLE SEAT RAIL LOCKING DEVICE

CROSS-REFERENCE TO RELATED APPLICATIONS

This application is a continuation of International Application No. PCT/KR2013/010853, filed on Nov. 27, 2013, which claims the benefit of Korean Application 10-2012-0136454, filed on Nov. 28, 2012. The disclosures of the above applications are incorporated herein by reference.

FIELD

The present disclosure relates to a locking device for a vehicle seat rail and, more particularly, to a mechanism of a locking device for a seat rail that fixes a seat sliding forward/backward on a car body.

BACKGROUND

The statements in this section merely provide background information related to the present disclosure and may not constitute prior art.

The positions of seats in a vehicle can be adjusted forward/backward on a car body by a fixed rail fixed to the floor of the car body and a moving rail that can slide forward/backward on the car body with respect to the fixed rail, and the adjusted positions can be firmly fixed by a locking device and can be easily changed for adjusting the seats.

Such a locking device for a seat rail generally protrudes outward from a fixed rail and a moving rail and can restrict movement of the moving rail with respect to the fixed rail, so the space under a seat is complicated. However, recently, it is required to more efficiently use a space because various convenience devices for a seat are applied to a seat. Further, in order to satisfy this requirement, the space around a seat rail is maximally used by minimizing the configuration protruding out of a space defined by a seat rail.

For reference, the seat rail stated above means both of the fixed rail and the moving rail.

SUMMARY

The present disclosure provides a locking device for a vehicle seat rail that can be formed in a compact size by inhibiting or preventing parts from unnecessarily protruding out of a space defined between a fixed rail and a moving rail and that can lock and unlock a seat rail with respect to the fixed rail while improving the use of the space defined by the fixed rail and the moving rail.

According to another aspect of the present disclosure, there is provided a locking device for a vehicle seat rail that includes: a fixed rail fixed to a car body; a moving rail longitudinally sliding with respect to the fixed rail and defining a space between the fixed rail and the moving rail; locking pins disposed in the moving rail and making a locked state by inserting into holes formed through the fixed rail; locking springs disposed around the locking pins and applying an elastic force to the locking pins against the moving rail to make the locked state; and an unlocking lever rotating about a rotational shaft fixed with respect to the moving rail and moving the locking pins out of the holes of the fixed rail.

According to the present disclosure, it is possible to achieve a locking device for a vehicle seat rail that can be formed in a compact size by inhibiting or preventing parts from unnecessarily protruding out of a space defined between a fixed rail and a moving rail and that can lock and unlock a seat rail with respect to the fixed rail while improving the use of the space defined by the fixed rail and the moving rail.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
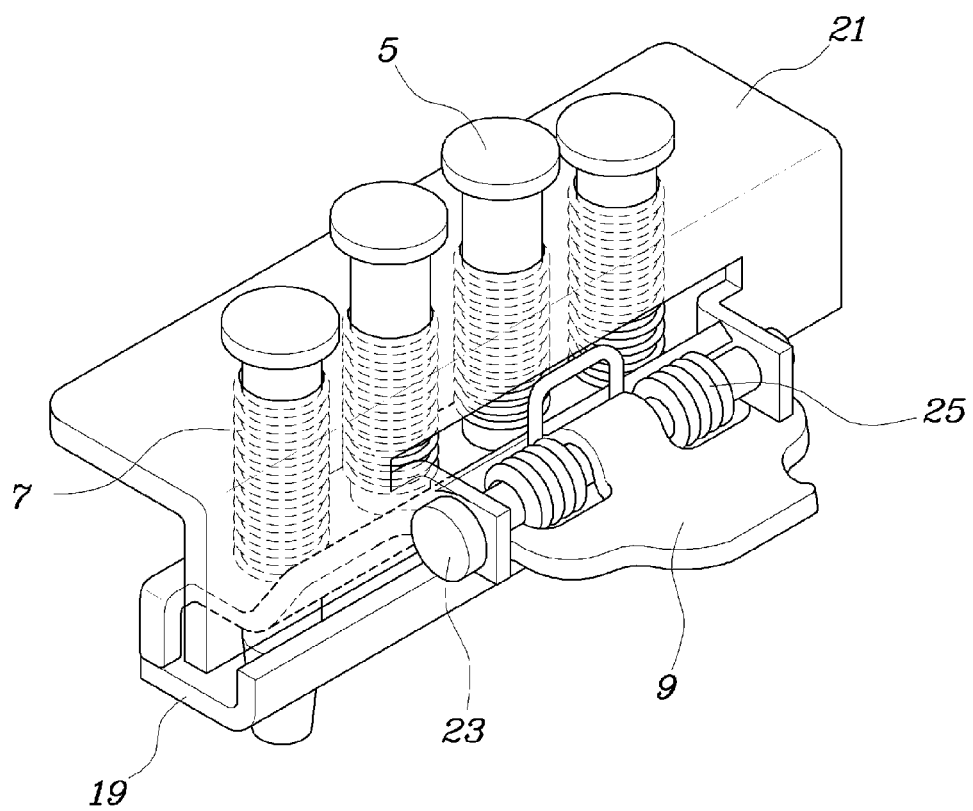
FIG. 1 is a view showing the configuration of a locking device for a vehicle seat rail according to the present disclosure.
Figure 2:
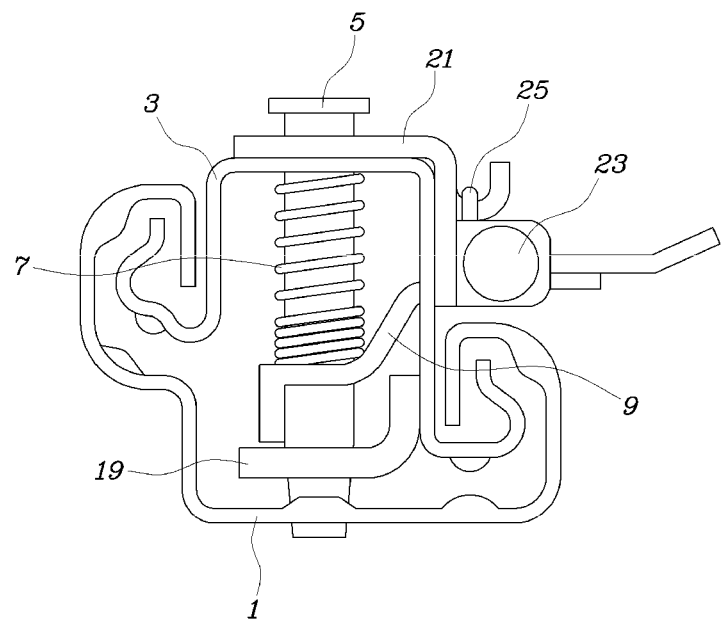
FIG. 2 is a cross-sectional view of FIG. 1.
Figure 3:
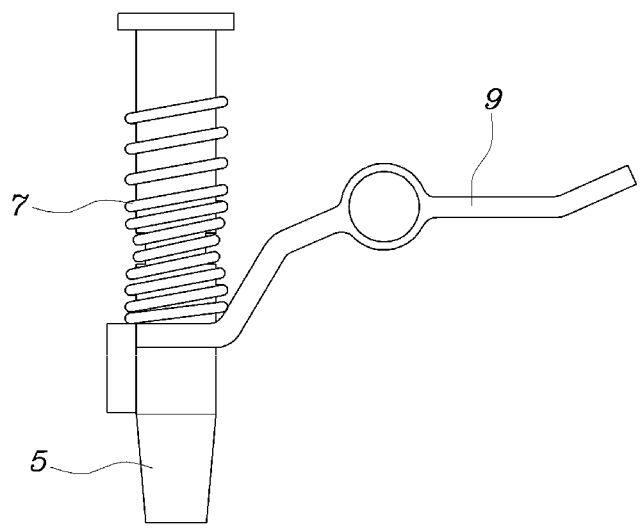
FIG. 3 is a view showing a locked state made by a locking pin, a locking spring, and an unlocking lever shown in FIG. 2.
Figure 4:
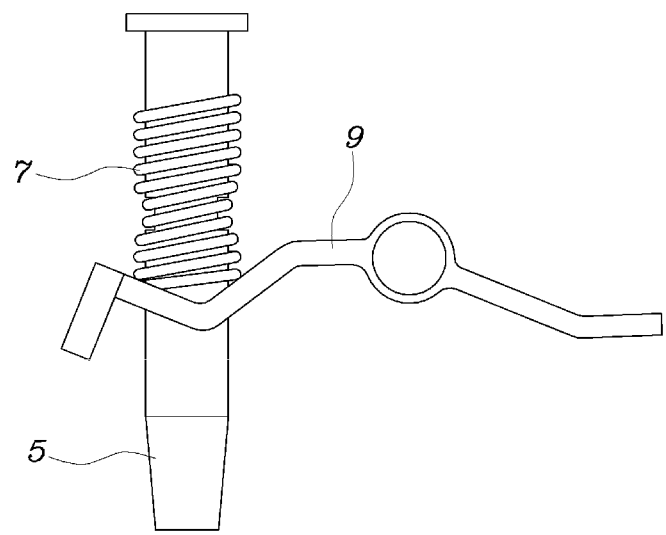
FIG. 4 is a view showing an unlocked state made by the configuration shown in FIG. 3.
Figure 5:
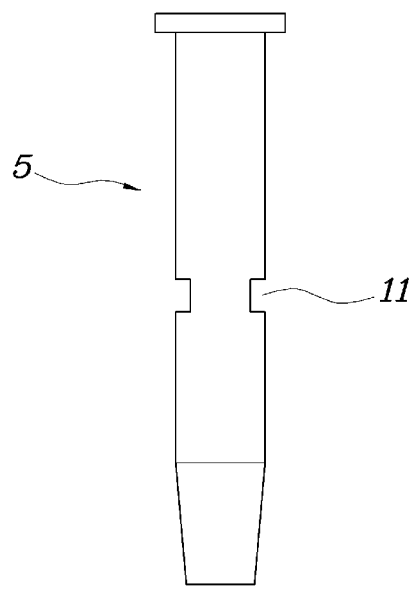
FIG. 5 is a view showing in detail the structure of a locking pin.
Figure 6:
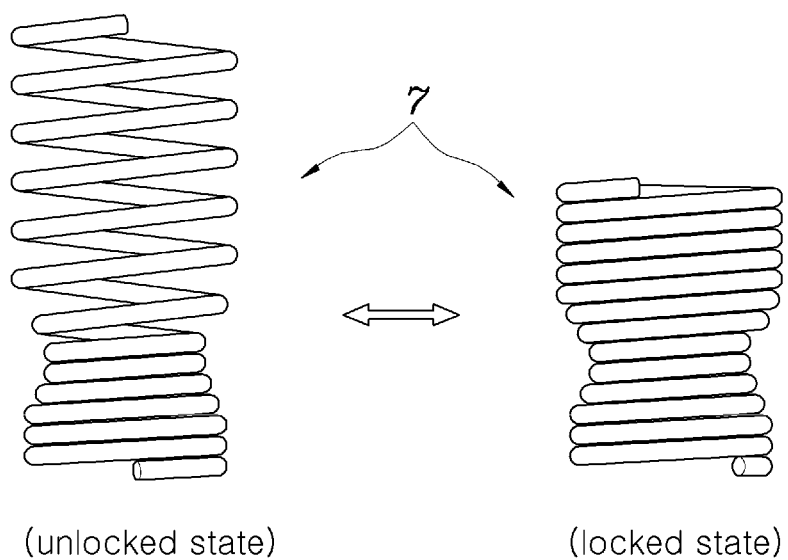
FIG. 6 is a view showing and comparing a locked state and an unlocked state by a locking spring.
Figure 7:
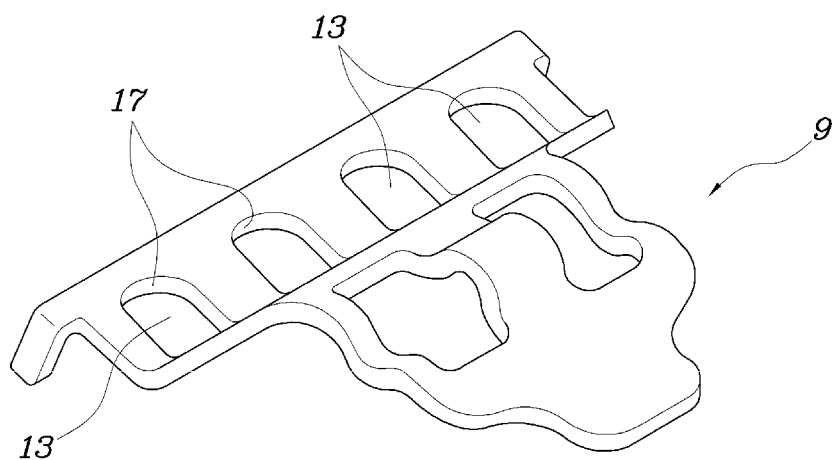
FIG. 7 is a perspective view showing an unlocking lever shown in FIG. 7.
Figure 8:
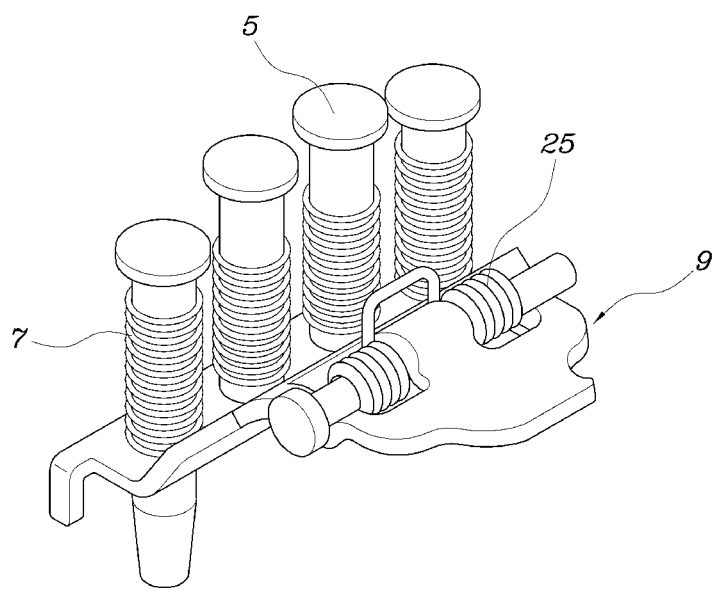
FIG. 8 is a perspective view showing only main parts of the locking device shown in FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1 to 11, a locking device for a vehicle seat rail according to one form of the present disclosure includes: a fixed rail 1 fixed to a car body; a moving rail 3 longitudinally sliding with respect to the fixed rail 1 and defining a space between the fixed rail 1 and the moving rail 3; locking pins 5 disposed in the moving rail 3 and making a locked state by being inserted into holes formed through the fixed rail 1; locking springs 7 disposed around the locking pins 5 and applying an elastic force to the locking pins 5 against the moving rail 3 to make the locked state; and an unlocking lever 9 rotating about a rotational shaft fixed with respect to the moving rail 3 and moving the locking pins 5 out of the holes of the fixed rail 1.

That is, the locking pins 5 are disposed in a space defined by the fixed rail 1 and the moving rail 3, inserted into the holes of the fixed rail 1 in a locked state by an elastic force provided by the locking springs 7, and separated from the fixed rail 1 in an unlocked state by the unlocking lever 9. Further, a portion of the unlocking lever 9 and portions of the locking pins 5 substantially protrude out of the space defined by the fixed rail 1 and the moving rail 3 so that the space around the fixed rail 1 and the moving rail 3 can be used as desired.

A spring groove 11 for fixing a portion of the locking spring 7 is formed on the middle portion of the locking pin 5 and the locking spring 7 is a coil spring having a relatively decreased diameter in a middle portion thereof and is fitted in the spring groove 11.

That is, the locking spring 7 has a middle portion inserted in the spring groove 11 of the locking pin 5 to apply and receive an elastic force. The upper end of the locking spring 7 is supported on the inner side of the moving rail 3 to elastically support the locking pin 5 toward a hole of the fixing rail 1 against the moving rail 3. The lower end of the locking spring 7 is in close contact with the unlocking lever 9 so that the unlocking lever 9 can transmit a force separating the locking pin 5 to the locking pin 5.

Accordingly, the locking pin 5 has does not interfere with the unlocking lever 9, so it receives the force from the unlocking lever 9 through the locking spring 7.

The unlocking lever 9 has insertion holes 13 in which the locking pins 5 are inserted, and has a bending portion 15 formed from the portion where the insertion holes 13 are formed to the rotational shaft to push the lower ends of the locking springs 7 to the locking pins 5 in the locked state, and has a contact pressing portion 17 formed inside the insertion holes 13 and pushing the locking pins 5 in the opposite direction to the direction in which the bending portion 15 pushes the locking springs 7 in the locked state.

Figure 9:
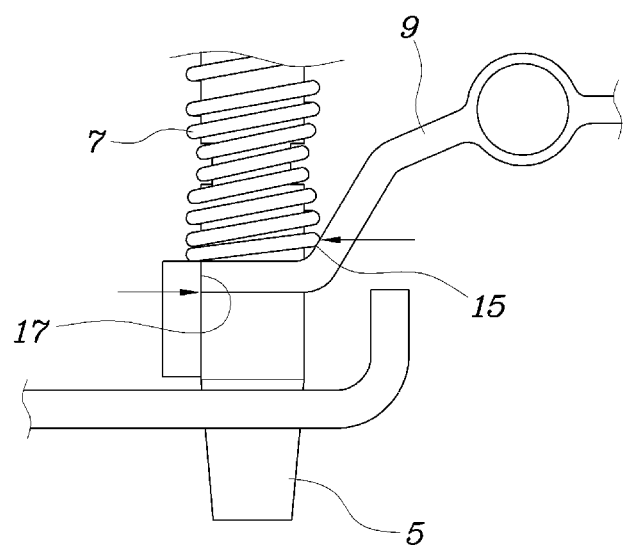
FIG. 9 is a view illustrating the relationship between the unlocking lever, the locking pin, and the locking spring in a locked state.
Figure 10:
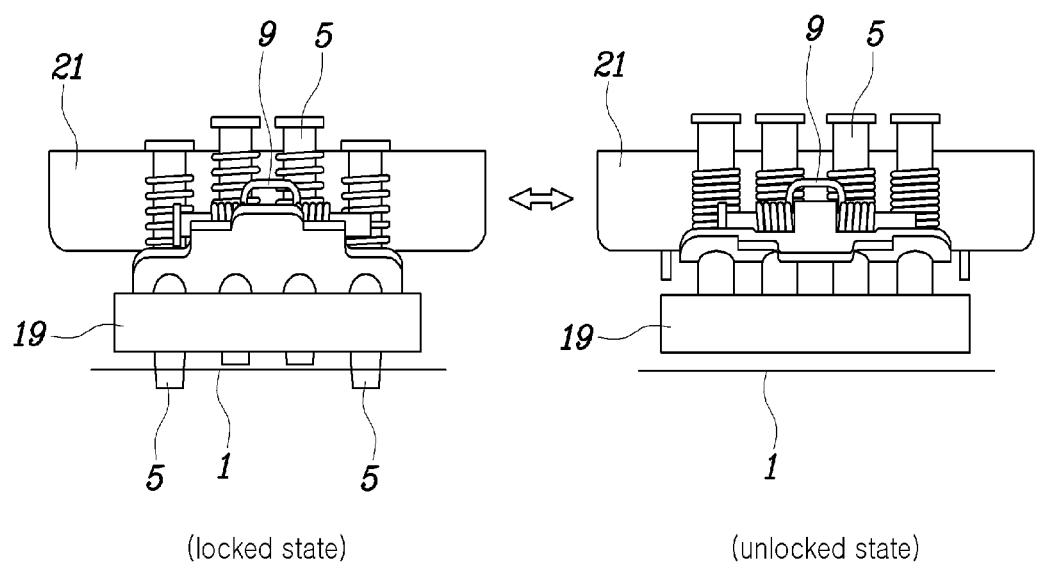
FIGS. 10 and 11 are views showing and comparing a locked state and an unlocked state at different angles.
Figure 11:
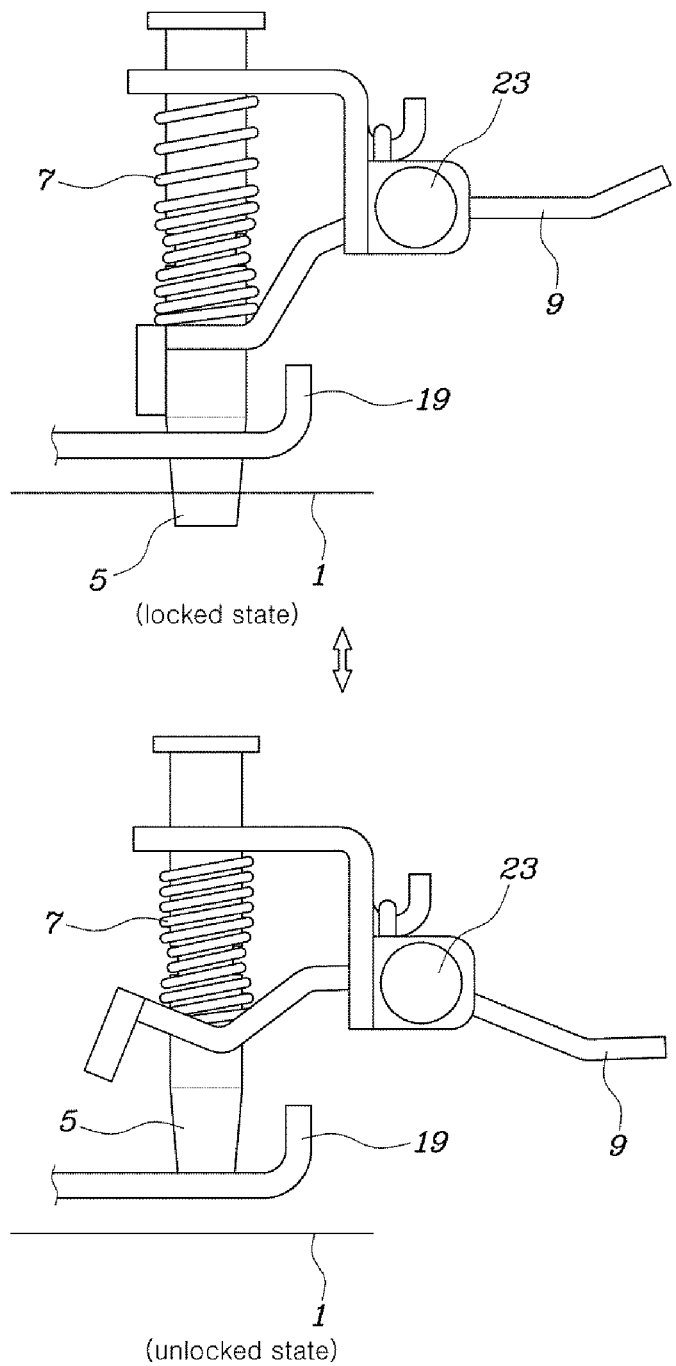

That is, as shown in FIG. 9, the contact pressing portions 17 inside the insertion holes 13 press the locking pins 5 to the right in the locked state and the bending portion 15 of the unlocking lever 9 pushes a side of the lower ends of the locking spring 7 to the locking pins 5, that is, to the left, so the locking pins 5 are inhibited or prevented from shaking due to a gap.

Substantially, the contact pressing portions 17 are portions of the inner sides of the insertion holes 13.

The moving rail 3 has a guide bracket 19 that guides the locking pins 5 to be inserted into the holes of the fixed rail 1 in the locked state and separated from the holes of the fixed rail 1 in the unlocked state.

A fixing bracket 21 for supporting the rotational shaft of the unlocking lever 9 is fixed to the outer side of the moving rail 3, the unlocking lever 9 is disposed through the moving rail 3 between the fixing bracket 21 and the moving rail 3 and has a fixing pin 23 as the rotational shaft, and a lever spring 25 elastically supporting the unlocking lever 9 to keep the locking pins 5 in the locked state is disposed between the fixing bracket 21 and the unlocking lever 9.

Accordingly, when the unlocking lever 9 is turned for unlocking, the locking pins 5 are unlocked by moving up against the elastic force by the lever spring 25 and the elastic force by the locking springs 7. When the unlocking lever 9 is released, the locking pins 5 are moved down by the locking springs 7 and inserted into the holes of the fixed rail 1, thereby achieving the locked state, and the unlocking lever 9 is turned back to the initial position by a restoring force of the lever spring 25.

In this form, the locking pins 5 are arranged in the longitudinal direction of the moving rail 3 and the unlocking lever 9 has the insertion holes 13 in which the locking pins 5 are inserted.

Accordingly, it is possible to unlock all the locking pins 5 at one time by operating the unlocking lever 9.

Although the present disclosure was described with reference to specific forms shown in the drawings, it is apparent to those skilled in the art that the present disclosure may be changed and modified in various ways without departing from the scope of the present disclosure, which is described in the following claims.

What is claimed is:

1. A vehicle seat rail locking device, comprising:
   a fixed rail;
   a moving rail configured to slide with respect to the fixed rail, wherein a space is defined between the fixed rail and the moving rail;
   locking pins disposed in the space along the moving rail and being disposed in holes formed through the fixed rail to generate a locked state;
   locking springs disposed around the locking pins and configured to apply a force to the locking pins against the moving rail to generate the locked state; and
   an unlocking lever configured to rotate about a rotational shaft fixed to the moving rail and to move the locking pins out of the holes of the fixed rail
   wherein a spring groove for fixing a portion of the locking spring is formed on a middle portion of the locking pin, and the locking springs are coil springs having a decreased diameter in a middle portion thereof so as to be fitted in the spring groove,
   wherein each of the locking springs comprises a first and a second end, and the first end of the locking spring is supported on an inner side of the moving rail to support the locking pin toward the holes of the fixing rail against the moving rail, and
   wherein the second end of the locking spring is in contact with the unlocking lever and configured to transmit, from the unlocking lever to the locking pin, a force separating the locking pin from the holes of the fixed rail,
   wherein the unlocking lever comprises:
     insertion holes in which the locking pins are inserted;
     a bending portion extending from a portion where the insertion holes are formed to the rotational shaft to push the second end of the locking springs to the locking pins in the locked state; and
     a contact pressing portion formed on inner sides of the insertion holes, and configured to push the locking pins in an opposite direction to a direction in which the bending portion pushes the locking springs.

2. The vehicle seat rail locking device according to claim 1, wherein the moving rail comprises a guide bracket guiding the locking pins to be inserted into the holes of the fixed rail in the locked state and separated from the holes of the fixed rail in an unlocked state.

3. The vehicle seat rail locking device according to claim 1, further comprising:
   a fixing bracket for supporting the rotational shaft of the unlocking lever, wherein the fixing bracket is fixed to an outer side of the moving rail, and the unlocking lever is disposed through the moving rail and has a fixing pin as the rotational shaft; and
   a lever spring supporting the unlocking lever to maintain the locking pins in the locked state, the lever spring being disposed between the fixing bracket and the unlocking lever.

4. The vehicle seat rail locking device according to claim 1, wherein the locking pins are arranged in a longitudinal direction of the moving rail.

5. The vehicle seat rail locking device according to claim 1, wherein a portion of the unlocking lever and portions of the locking pins substantially protrude out of the space.

6. The vehicle seat rail locking device according to claim 1, wherein the locking pins do not interfere with the unlocking lever so as to receive force from the unlocking lever through the locking springs.

\* \* \* \* \*